United States Patent [19]

Riza

[11] Patent Number: 5,718,226

[45] Date of Patent: Feb. 17, 1998

[54] PHOTONICALLY CONTROLLED ULTRASONIC PROBES

[75] Inventor: Nabeel A. Riza, Orlando, Fla.

[73] Assignee: University of Central Florida, Orlando, Fla.

[21] Appl. No.: 693,350

[22] Filed: Aug. 6, 1996

[51] Int. Cl.$^6$ .................................................. A61D 8/00
[52] U.S. Cl. ................................................. 128/660.01
[58] Field of Search ................ 128/660.01; 342/375, 342/368

[56] References Cited

U.S. PATENT DOCUMENTS

5,231,405  7/1993  Riza ........................................ 342/375

*Primary Examiner*—Marvin M. Lateef
*Assistant Examiner*—Derrick Fields
*Attorney, Agent, or Firm*—Burns, Doane, Swecker & Mathis, L.L.P.

[57] ABSTRACT

Wavelength diversity coupled with fiber-based time delay, optical energy delivery, and ultrasonic energy sensing, are proposed to form a novel, rapidly tunable (e.g., 1 Khz–100 Mhz) and wide instantaneous bandwidth (e.g., >50% bandwidth at center carrier), ultrasonic probe system for therapy, diagnostics, and non-invasive surgery, particularly for intracavity operation with a typical 100 channel/transducer element count. This ultrasonic system architecture is a multi-wavelength optical delay line module using two high speed (i.e., <10 microseconds wavelength switching time), bulk acousto-optic tunable filters, that provide collinear, high power, multi-wavelength optical input and output beams. This wavelength selection module also provides high optical throughput (e.g., 90% efficiency) and excellent (e.g., −30 db) optical blockage of the unwanted leakage (undiffracted) light, preventing noise propagation when such modules are cascaded to provide many variable signal time delays. The overall system also uses another multi-wavelength module that adjusts the optical polarization of the optical beams at various critical stages of the proposed polarization sensitive ultrasonic control system. This polarization controller is based on an interferometric design using a variety of low loss two dimensional pixelated thin-film device arrays of various types of liquid crystals such as twisted nematic, parallel-rub birefringent-mode, and ferroelectric. These liquid crystal devices form the required polarization mode converters, phase shifters and half-wave plates required to form our novel polarization control module.

34 Claims, 7 Drawing Sheets

PHOTONICALLY CONTROLLED ULTRASONIC PROBES

BACKGROUND OF THE INVENTION

1) Field of the Invention

The present invention relates to a fiber optic based ultrasonic intracavity photonic tool for ultrasonic transmit probing (e.g., acoustic knife) and ultrasonic receive probing (e.g., imaging) in human patients and other living creatures.

2) Discussion of Related Art

There is an increasing need for developing minimally invasive low cost medical tools for therapeutic, diagnostic and surgical applications. In particular, there is a push for developing ultrasonic energy-based intracavity or endoscopic (i.e., inserted into a cavity such as a blood vessel, esophagus or rectum) probes, as ultrasonic energy offers excellent properties for imaging, healing or ablating selected parts of a human body and other life forms. One recent example for ultrasonic surgery is called High-Intensity Focussed Ultrasound (HIFU) where an "acoustic knife" operating at a typical ultrasonic frequency of 55 Khz is used to thermally ablate malignant tissue inside the body without effecting the surrounding healthy tissue. HIFU has the potential to provide bloodless, minimal patient stress, short recovery time and fast surgery, thus benefiting both the patient and the health care provider. Another important example of endoscopic ultrasonics is lithotripsy, where an intracavity probe operating around 20–40 Khz is inserted near a kidney stone to be destroyed. Both HIFU and lithotripsy applications use relatively low ultrasonic frequencies (<100 Khz), particularly when compared to the 5–15 Mhz band used in diagnostic, external, cavity imaging ultrasound.

Today, with endoscopic applications in mind, a very high ultrasonic frequency (e.g., 100 Mhz) probe with high (>50%) instantaneous bandwidths is desirable as higher frequencies give higher imaging resolution and smaller physical dimensions of the front-end intracavity transducer array. This allows for placement of probes in small cavities like arteries for imaging blood vessels. N. Born and J. Roelandt, *Intravascular Ultrasound*, Dordrecht:Kluwer Academic, 1989. Furthermore, in all the previously mentioned ultrasonic applications, it is highly desirable to implement non-mechanical steering of the ultrasonic energy, thus efficiently directing energy to the desired site. In particular, for intracavity probes where front-end transducer space and power are limited, mechanically moving parts must be avoided. Hence, ultrasonic beamforming should be implemented electronically, as is done in most high end ultrasound imaging machines.

SUMMARY OF THE INVENTION

It is desirable to have ultrasonic energy control systems that, with minimal hardware changes, operate over wide tunable and instantaneous bandwidths, such as required for the different ultrasonic medical modes. A potentially compact, high performance, photonic beamforming controller for wideband ultrasonic arrays is disclosed herein using current, mature fiber-optic (FO) technology to develop low cost, high performance ultrasonic system. A novel FO control system suited for intracavity ultrasonic probes, particularly for wide instantaneous bandwidth high resolution imaging, is also disclosed.

Specifically, the invention includes a photonically controlled ultrasonic array system having a wave division multiplexed photonic beamformer, an optical fiber cable, and a wave division multiplexed photonic ultrasonic array remote probe.

In an ultrasonic transmission embodiment or transmission section, the optical fiber cable receives wave division multiplexed light from the wave division multiplexed photonic beamformer, and the wave division multiplexed photonic ultrasonic array remote probe generates ultrasonic energy from the wave division multiplexed light received from the optical fiber cable.

In an ultrasonic receive embodiment or reception section, the wave division multiplexed photonic beamformer includes a multiple wavelength light source which acts as a continuous local oscillator for the wave division multiplexed photonic ultrasonic array remote probe, the optical fiber cable receives multiple wavelength light from the light source, and the wave division multiplexed photonic ultrasonic array remote probe modulates the multiple wavelength light in response to received ultrasonic energy and transmits the modulated multiple wavelength light through the optical fiber cable to the wave division multiplexed photonic beamformer.

The invention includes the use of a novel multiple channel polarization control module having a wavelength demultiplexer which physically separates the different wavelength light beams, two pixelated and orthogonally oriented polarization mode converters which receive and convert the polarization of the different wavelength light beams, a Mach-Zehnder interferometer or the like including a cube beamsplitter, a cube broadband polarizing beam splitter (PBS) which receives near equal amplitude p and s states of polarization (SOPs) from the polarization mode converters and individually directs the p and s SOPs to separate first and second paths, which are designed to be equal, respectively, in the Mach-Zehnder interferometer. Additionally, this polarization control module has first and second phase shifters in the first and second paths which provide the required optical phase shift of the s and p SOP beams, first and second 90° polarization rotators operating 180° out-of-phase to determine whether p or s linear SOP is output from the polarization control module, wherein by controlling the first and second mode converters, the first and second phase shifters, and the first and second rotators, the two beams interfering at the cube beamsplitter can be made to be equal in amplitude, in-phase or 180 degree out-of-phase, and hence of the desired p or s linear SOP. Further, multiplexers recombine the different wavelengths to create the desired s or p SOP collinear multi-wavelength output beams.

The invention includes the use of a novel multi-wavelength photonic signal control module having a first acousto-optic tunable filter (AOTF) to spatially separate at least one selected wavelength of light from others in a multiwavelength beam, an external signal processing port which diverts and realigns a beam of one or more of the wavelengths into an optical processing element, the external signal processing port re-aligning the selected light in an optical path of the photonic signal control module, a second AOTF and a spatial block for Fourier plane filtering and to reduce noise.

Although other, non-medical applications are possible with the photonically controlled ultrasonic system disclosed herein, the exemplary embodiments involve medical applications.

BRIEF DESCRIPTION OF THE DRAWINGS

The invention will now be described by way of exemplary embodiments shown in the accompanying drawing figures in which.

DETAILED DESCRIPTION OF EXEMPLARY EMBODIMENTS

There are several reasons for turning to fiber optics (FOs) for intracavity applications. Optical fibers are extremely low loss (e.g., <0.5 dB/km), highly flexible (in terms of twisting and bending), lightweight, electromagnetic interference (EMI) free, very wide radio frequency (rf) bandwidth (e.g., 100 Ghz) optical energy guides. Compared to a radio frequency (rf) multiwire cable feeding a typical 256 element intracavity probe, an optical fiber cable is a near perfect choice in terms of electrical, optical and mechanical properties for a conduit of optical energy that controls and senses ultrasonic energy at the intracavity site. More importantly, in multiwire cable systems at a high rf such as 50 Mhz required for ultracompact imaging probes, the rf cable losses, EMI, and electronic beamformer design are not trivial. In particular, running a multi-wire cable within the human body is potentially dangerous for the patient because of possible high rf fields and electrical shock hazards. The use of fiber optics avoids these hazards.

Unlike the multitude of transducers used in optically controlled radar beamforming, a wideband intracavity ultrasonic probe would have at most a few hundred independent transducers (or processing channels) with a few meters of fiber for placing the transducer at remote locations inside a body. Also, there is a relatively low power consumption requirement (both at the probe and in the external beamformer) due to the short (e.g., 1 cm) endoscopic field of view. Unlike rf and microwave antenna arrays that require short nanosecond regime time delays that can in most cases be implemented using non-fiber delay designs, the high frequency ultrasonic application requires very long delays that go into the microsecond regime. Hence, the low loss of optical fibers provides an excellent medium to get these rather long time delays using small reels of fibers (coils of optical fibers, e.g., 1 cm in diameter). Nevertheless, FOs does have its limitations, particularly in the optical interconnection and coupling area where optical losses can quickly add up, and the low noise optical modulation area where optical noise increases in the much higher radar band. Fortunately, unlike advanced radar, ultrasonic intracavity applications require lower operation frequencies (e.g., <100 Mhz), fewer independent array processing channels, with low power dissipation and consumption.

Hence, described herein is a novel FO-based ultrasonic intracavity system that minimizes FO interconnection and coupling complexity, and provides a high efficiency and powerful (particularly in terms of operational bandwidths) photonic tool for ultrasonic transmit and receive probing. In particular, channel optical wavelength division multiplexing (WDM) is used to minimize FO interconnection and coupling complexity. WDM has been proposed for use by the optical telecommunications industry, FO sensor industry, and phased array antenna/radar community for hardware reduction.

Figure 1:
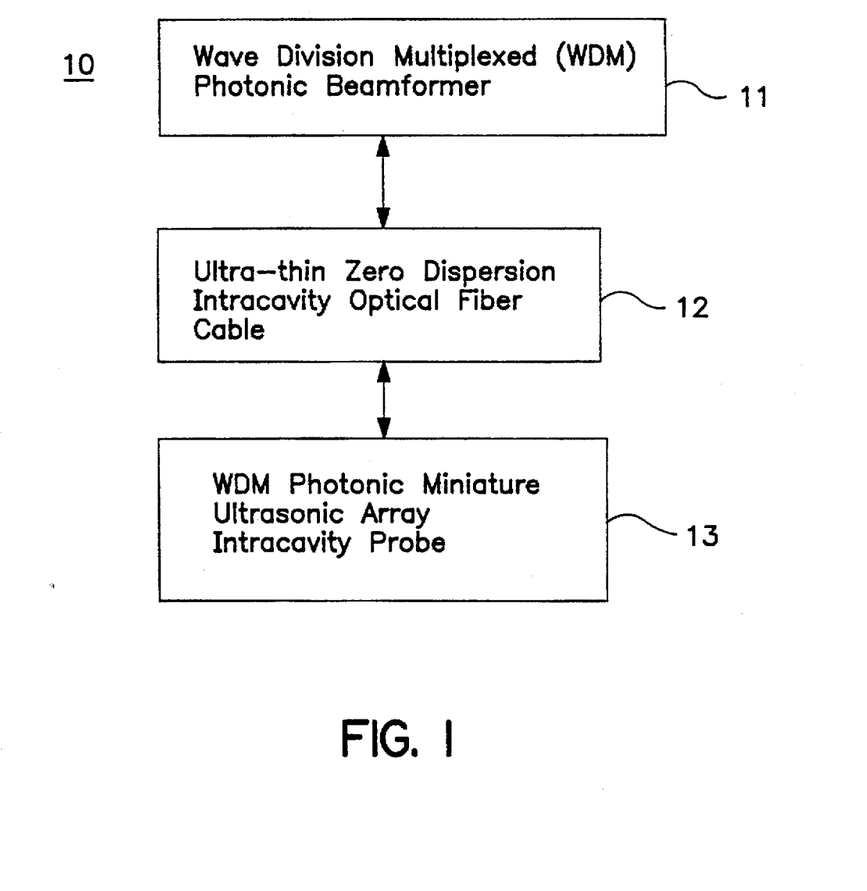
FIG. 1 is a representational block diagram of a photonically controlled ultrasonic probe in accordance with the present invention.

FIG. 1 shows a block diagram of the basic photonically controlled ultrasonic array system 10. The photonically controlled ultrasonic array system 10 includes a wave division multiplexed (WDM) photonic beamformer 11, an ultrathin, zero dispersion intracavity optical fiber cable 12, and a WDM photonic miniature ultrasonic array intracavity probe 13.

The first part of the system is the WDM photonic beamformer 11 that optically generates the required beamforming signal set parameters, i.e., ultrasonic signal center frequency, instantaneous bandwidth or pulse width, amplitude variation or pulse shape, transmit pulse peak power, receive signal modulation depth/dynamic range, signal set time/phase delays, and ultrasonic beam scan width and scan resolution.

The photonic beamformer 11 includes certain standard or existing and/or commercially-available WDM optics such as FO multiplexers (MUX), demultiplexers (DEMUX), optical fibers with gratings, dispersive optical fibers, FO circulators, plus other general polarization optics such as polarizers (P), polarization beam splitters (PBSs), and polarization maintaining fibers (PMFs) as described below. More importantly, in addition to the novel configuration, the photonic beamformer 11 includes two novel WDM modules 21 and 22.

The first novel module is a photonic signal control (PSC) module acting as a multi-wavelength optical delay line module 21 (FIGS. 2 and 3) using two high speed (i.e., <10 microseconds wavelength switching time), bulk acousto-optic tunable filters 61, 62 (FIG. 6) that provided collinear, high power, multi-wavelength optical input and output beams. This wavelength selection module 21 also provides high optical throughput (e.g., 80% efficiency) and excellent (e.g., −30 db) optical blockage of the unwanted leakage (undiffracted) light, preventing noise propagation when such modules are cascade connected to provide many variable switched signal time delays.

The second novel module in the photonic beamformer 11 is another multi-wavelength module 22 (FIGS. 2 and 3) that adjusts the optical polarization of the optical beams at various stages of the polarization sensitive ultrasonic control system 10. This polarization controller 22 is important for high efficiency operation of the overall system, and is based on an interferometric, zero-path length difference optical design, using a variety of low loss two dimensional pixelated thin-film device arrays of various types of liquid crystals such as twisted nematic, parallel-rub birefringent-mode, and ferroelectric liquid crystals. These liquid crystal devices form the desired polarization mode converters, phase shifters and half-wave plates used to form this novel polarization control module 22.

Figure 2:
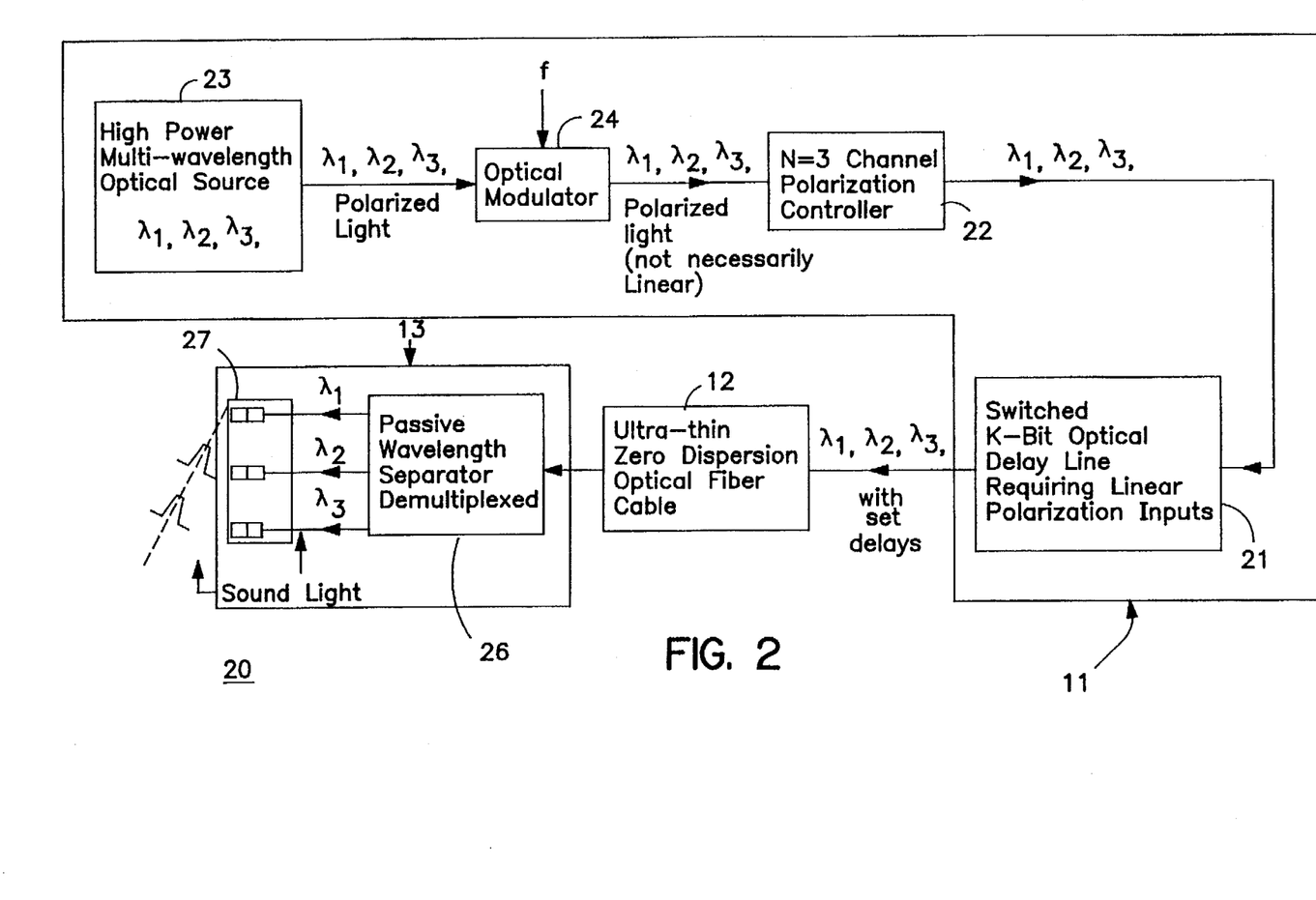
FIG. 2 illustrates an exemplary photonically controlled transmit ultrasonic probe in accordance with the present invention.
Figure 3:
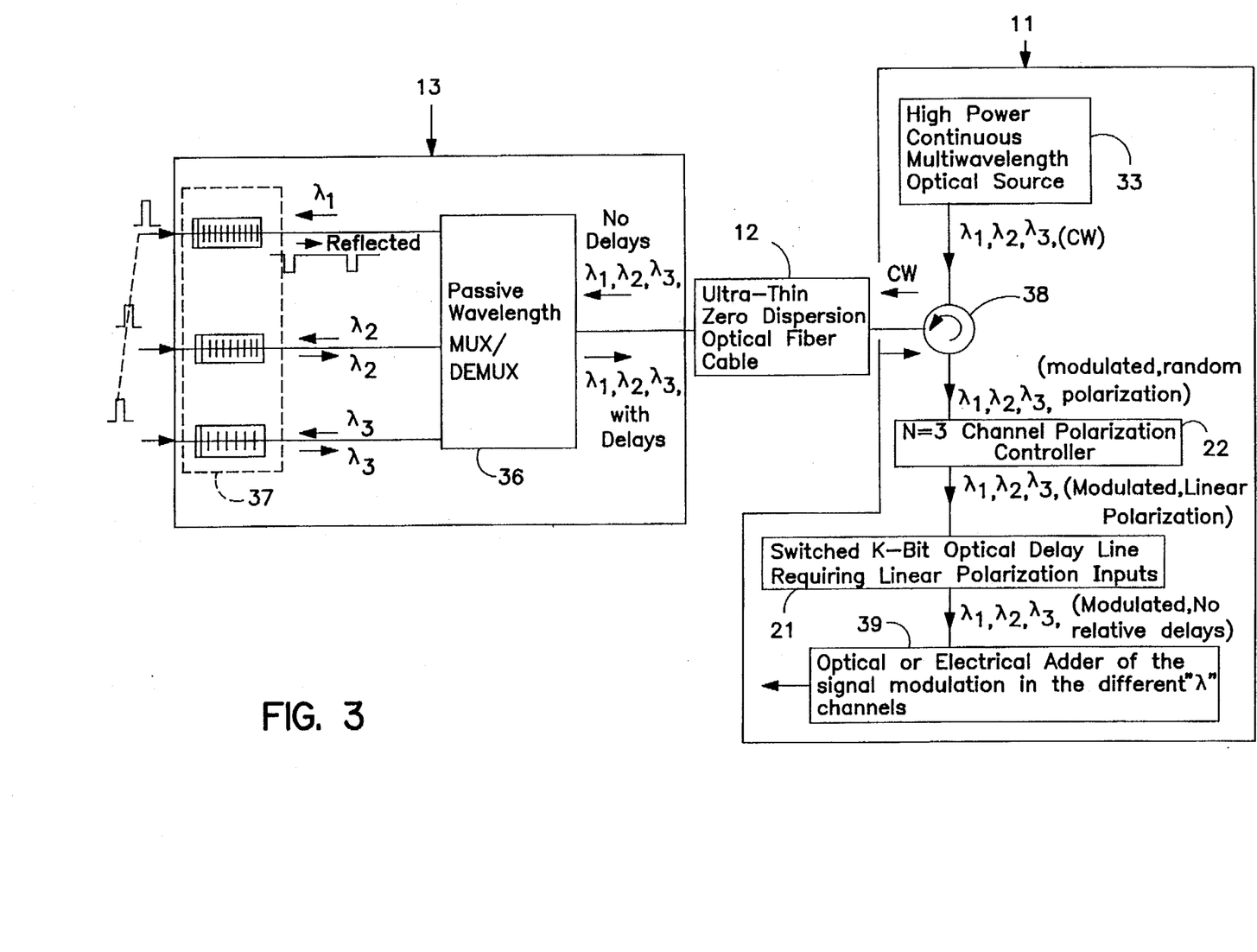
FIG. 3 illustrates an exemplary photonically controlled receive ultrasonic probe in accordance with the present invention.

As shown in FIG. 1, the photonic beamformer 11 is remotely connected to the ultrasonic probe via a single zero-dispersion optical fiber 12. The zero-dispersion optical fiber 12 is desired so as to not introduce any relative wavelength dependent time delays, as this would likely cause unwanted ultrasonic beam location error in the system, although this type of error can be compensated for if a single zero-dispersion fiber is not used. Much work has been done by the FO sensor community for developing WDM and grating-based FO strain sensors, and these concepts can be used for the ultrasonic system 10. FIGS. 2 and 3 respectively show the present inventor's photonically controlled transmit 20 and receive ultrasonic probe 30 system architectures. The novel aspects of these photonically controlled ultrasonic probe systems 10, 20 and 30 are described herein with like parts being provided with like reference numbers.

As mentioned above, a WDM beamformer 11 is used to minimize both the beamforming hardware, and more importantly, the intracavity remote FO cable 12 and front-end optical sensor or probe 13 hardware. This reduces the number of FO point-to-point interconnections, and thus minimize excessive coupling losses. As shown for both the transmit-mode probe system 20 in FIG. 2, and the receive-mode probe system 30 in FIG. 3, the processed light energy essentially travels in one physical optical channel that is sometimes an optical fiber and sometimes a free-space or solid-optics channel. Only at the ultrasonic system's front-end 13, and possibly a receive electrical adder 39 (described below), are the multiple wavelengths separated into different physical channels. This leads to major hardware reduction, and also allows the use of a flexible, ultra-thin (e.g., 100 micron), hair-like, optical cable 12 for remote intracavity operation.

For transmit-only operation as shown in FIG. 2, light from a high power (e.g., 1 Watt CW) N-wavelength broadband optical source (e.g., CW or pulsed laser) 23 is fed to a single broadband optical modulator 24 that produces short optical pulses (e.g., 0.1 μs width) of any particular shape at a desired rate (e.g., 10 Khz) according to a transmit ultrasonic rf signal. This N=3 wavelength (only three wavelengths are shown for simplicity) optical pulse is first fed to the N=3 channel polarization control module 22, and then into the single physical optical channel, K-bit, switched, FO delay line module 21. This is because the optical pulse output from the modulator 24 might have different state of polarization (SOP) for the different wavelengths. Because high efficiency operation suggests that the N-wavelengths input to the polarization-based delay module 21 should be of a given linear polarization (e.g., p or parallel polarization), a multi-wavelength polarization control module 22 is used.

Based on the settings of the variable time delay module 21, the different wavelengths acquire different time delays, as required for forming the desired ultrasonic beam at the remote probe location. These N-wavelength signals (e.g., N=100 using a 100 nm optical bandwidth with a 1 nm channel spacing) with appropriate delays are fed through a zero-dispersion fiber cable 12 that feeds this optical energy to the probe 13 intracavity site in the body where the ultrasonic energy medical procedure is desired. In non-imaging modalities such as therapy, lithotripsy and surgery (e.g., dental and cardiac), only the transmit operation of the intracavity probe 13 is generally required. In this case, the N-wavelength time delayed optical energy (transmit pulse) is demultiplexed by a demultiplexer 26 (e.g., via a tiny diffractive optical element such as a grating) in the intracavity probe 13. These physically separated N light beams then shine on an N-element ultrasonic transducer array 27 that generates the desired ultrasonic beam at the required intracavity site. For instance, the N delayed light pulses could activate N photoconductive switches (PCSs) that electrically drive N piezoelectric transducer elements. Another option is to replace the PCSs with a photoacoustic material. These options, along with advances in micromachining technology, can result in an ultracompact optically fed ultrasonic probe 13.

FIG. 3 shows a receive-only photonically controlled ultrasonic probe system 30 that, in effect, uses many of the same modules used for the transmit-only probe system 20. Again, a multi-wavelength polarization control module 22 is used, at this time, the receive ultrasonic pulse modulated optical beams coming through the remote zero-dispersion fiber 12 might have different SOPs for the different wavelengths. In FIG. 3, it is important to note that the continuous multi-wavelength source 33 directly (without passing through the delay line module 21) feeds the remote front-end sensor array 37 through the optical fiber cable 12, and thus acts as a continuous local oscillator for the receive front-end ultrasonic sensor array 37. By example, a general fiber-grating sensor array 37 is shown in FIG. 3 for ultrasonic energy detection. As developed by the FO sensor community, there are several methods to form this WDM FO sensor array 37, including using acoustically sensitive fiber Bragg grating tips with light absorbers and fiber gratings, and Zinc Oxide (ZnO) piezoelectric coated fibers (these act as all-fiber optical phase shifters). The traveling ultrasonic pressure wave compresses and expands the fiber grating, hence optically phase and wavelength modulating the light in the fiber channel. Both interferometric and non-interferometric optical modulation detection techniques can be used for the ultrasonic fiber sensor receive array 37, and these have been discussed in FO sensor literature.

These ultrasonic receive pulse modulated optical signals at different wavelengths are transmitted from the receive array 37 through optical fibers and combined by a passive wavelength multiplexer/demultiplexer 36, travel through the zero-dispersion fiber 12 into the single physical channel multi-wavelength time delay module 21 after passing through an optical circulator 38, commercially available through, e.g., Melles-Griot in Irvine, Calif., and the polarization controller 22. In this receive system 30, after multichannel signal processing (e.g., relative time delay cancellation) via the multi-channel photonic delay module 21, the received ultrasonic signal modulations are added via optical or electrical means 34, as shown in FIG. 4.

Figure 4A:
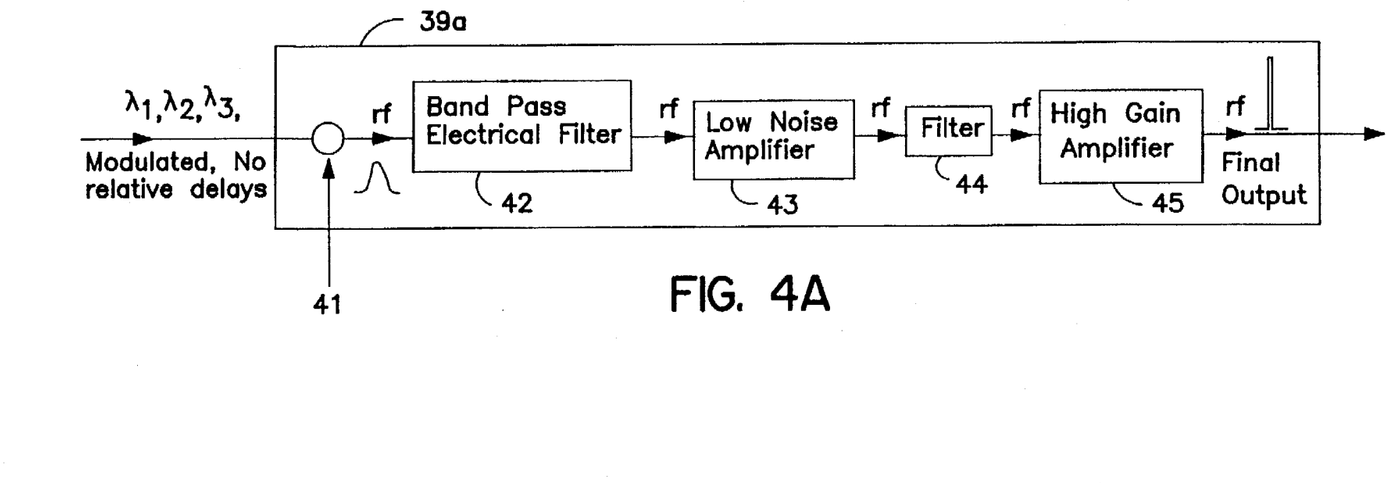
FIGS. 4a and 4b illustrate an optical or electrical adder module that can be incorporated in the receive ultrasonic probe of FIG. 3.

In the optical method shown in FIG. 4(a), the different wavelengths are added in intensity, and the heterodyne wavelength mixing harmonics, if present, is out of the electrical bandwidth of a photoreceiver 41. Specifically, the modulated light $\lambda_1$, $\lambda_2$, $\lambda_3$ without relative delays are detected by a high dynamic range photo receiver 41, such as an avalanche photodiode, with threshold logic. The detected light signal is passed through a band-pass electrical filter 42, the band-pass filtered signal is then amplified by a low noise amplifier 43, passed through another filter 44 and a high gain amplifier 45 for final output, in this example. This then gives the desired linear summation of the ultrasonic receive pulse modulations.

Figure 4B:
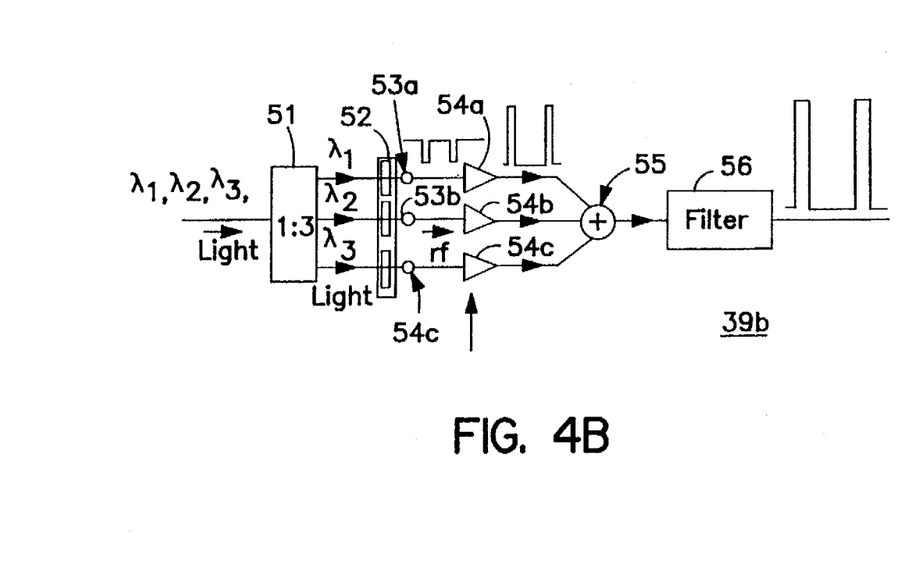

Using the electrical method shown in FIG. 4(b), the different wavelengths or ultrasonic receive pulse signal modulations are detected by respective photoreceivers 53a, 53b, 53c after being separated by a WDM demultiplexer 51 and passed through an optical filter bank 52. The result is filtered by an electrical filter 56 before output. In this case, linear signal summation in an electrical adder 55 is done after photo-detection and amplification by respective low noise amplifiers 54a, 54b, 54c each with threshold logic. This method adds more hardware, but can improve receive signal dynamic range and reduce nonlinear effects in the optoelectronics. The concepts in FIGS. 4a and 4b are not new, and have been proposed by the present inventor for antenna and radar array processing applications.

Figure 5:
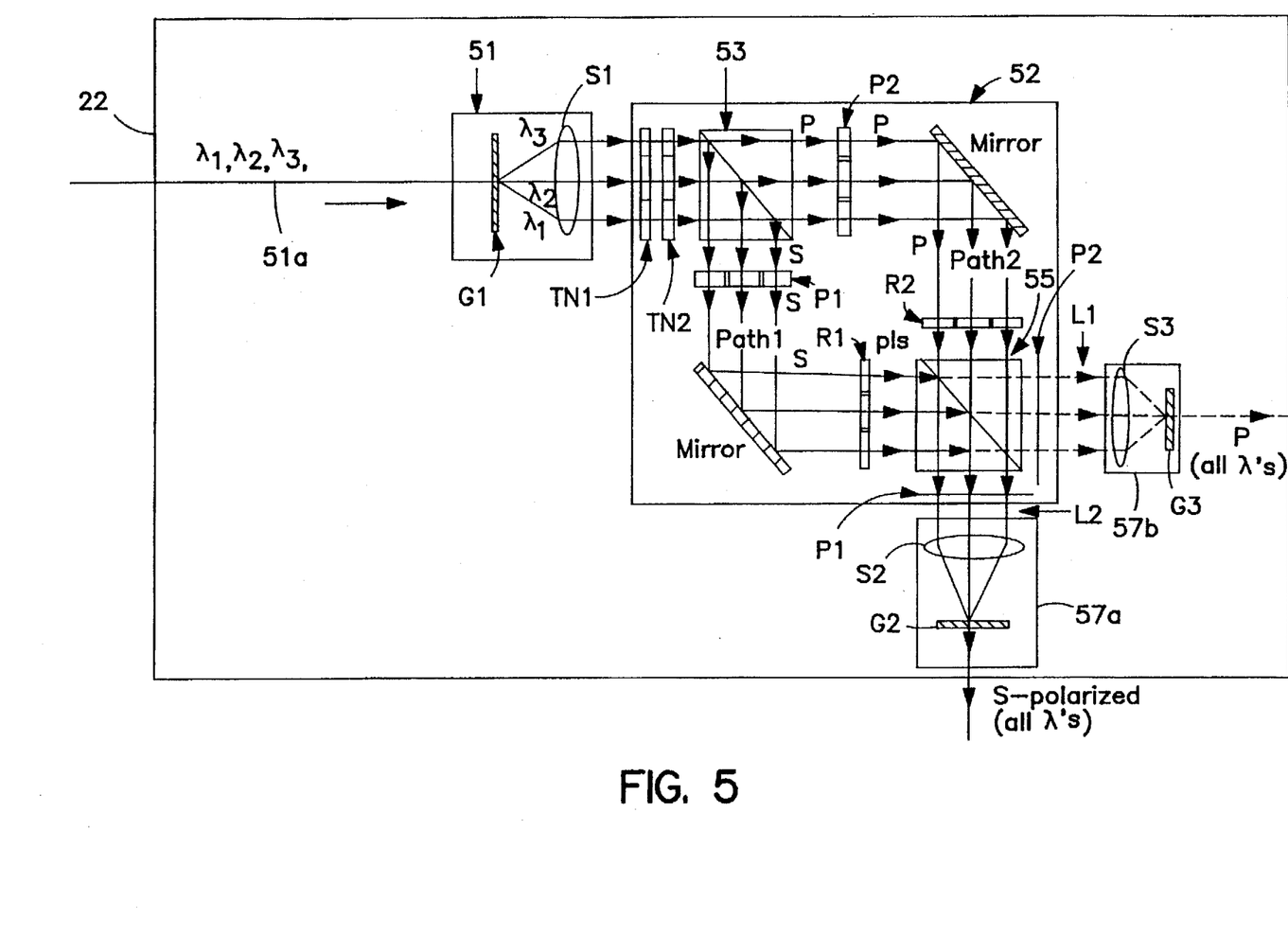
FIG. 5 illustrates an exemplary multi-wavelength polarization controller, shown for three channels, that can be incorporated in the embodiments of FIGS. 3 and 4 in accordance with the present invention.

FIG. 5 shows an exemplary novel multi-wavelength polarization controller (PC) module 22. Unlike previous polarization control modules that rely on single channel fiber and integrated-optic (IO) devices that are high loss and expensive to produce, this PC module 22 is a multichannel (e.g., 100 channels for 100 wavelengths) module that uses compact, low cost, and low interconnection complexity 3-D bulk optics with low loss 2-D electrically controlled pixelated thin-film liquid crystal devices. This results in a high channel count, high optical throughput PC module.

In the most general case, collinear, unknown SOP broadband light containing different colors enters the PC module 22 via an optical fiber or free-space/solid optics entry port 51a. A 1:N spatial wavelength demultiplexer 51 including diffraction grating G1 (or any other wavelength spatially dispersive optical element, e.g., a prism) and a spherical lens S1 physically separates the different wavelength light beams. The spherical lens S1 makes those beams collinear. Light then passes through two pixelated and orthogonally oriented polarization mode converters TN1 and TN2. These mode converters TN1 and TN2 can be 90 degree twist NLC devices, where a first mode converter TN1 rotates p to s (or vertical linear) SOP, with full 90 degree rotation obtained when the device has no applied voltage, while essentially no linear SOP rotation when fully on, i.e., when a high voltage (e.g., 5 V) is applied. More importantly, the first mode converter TN1 provides high resolution grey-scale linear SOP rotation between 90 and zero degrees for a variable applied voltage.

The second mode converter TN2 is a similar, but orthogonally oriented 90 degree twist NLC device. In this case, the second mode converter TN2 rotates s to p linear SOP over a grey-scale rotation angle controlled by the variable applied voltage. The first and second mode converters TN1 and TN2 are used to take any input polarization, and generate light with near equal amplitude p and s SOPs that are then individually directed by the cube broadband polarizing beam splitter (PBS) 53 to path 2 and path 1, which are designed to be equal, respectively, in the Mach-Zehnder interferometer 52.

First and second phase shifters P1 and P2 act as analog grey-scale control optical phase shifters providing the required optical phase shift of the s and p SOP beams, respectively, that occur after the PBS 53. The first and second phase shifters P1 and P2 are preferably parallel-rub, birefringent-mode, electrically controllable NLC devices.

First and second 90° polarization rotators R1 and R2 operate 180° out-of-phase, and determine whether p or s linear SOP is desired at the output of the PC module 22. The first and second rotators R1 and R2 act as broadband 90 degree on/off mode linear SOP rotators, and can be 90 degree twist NLC devices or binary ferroelectric liquid crystal (FLC) devices. By controlling the mode converters TN1, TN2, the phase shifters P1, P2, and the rotators R1 and R2, the two beams interfering at the cube 50:50 beamsplitter (BS) 55 can be made to be equal in amplitude, in-phase or 180 degree out-of-phase, and hence of the desired p or s linear SOP.

By monitoring light levels via a beam splitter-photosensor (not shown) placed between one of the output polarizer P1(s) and P2(p) and a corresponding lens pair S2 or S3 at one of the module output ports (e.g., L1 and/or L2), and hence minimizing this light output, the light at the other output port can be maximized through a feedback loop (not shown). Furthermore, the high extinction fixed polarizers P1(s) and P2(p) can suppress any unwanted polarization noise in the PC module 22. The spherical lenses S2 and S3 and gratings G2 and G3 form N:1 multiplexers 57a, 57b which are used to recombine the different wavelengths to create the desired s or p SOP collinear multi-wavelength beam.

Because this PC module 22 is based on interference of two equal amplitude and similar linear SOP beams, the PC module 22 is designed to exist as one solid-optical block with no moving parts and no free-space gaps. The speed of the PC module 22 depends on the switching speed of the electrically activated devices and also on the feedback loop processing speed. With current high speed (e.g., Mhz rate) photosensor arrays and digital electronic processing power, at present, the PC module speed is limited by the millisecond regime response of the grey-scale single cell twisted and birefringent-mode NLC devices that make up the first and second mode converters TN1, TN2, and the first and second phase shifters P1 and P2. With faster grey-scale optical phase and SOP mode conversion devices, the PC module 22 can operate in the few microseconds regime. Hence, this PC module 22 can be successfully used in the proposed photonically controlled ultrasonic probe system.

Figure 6A:
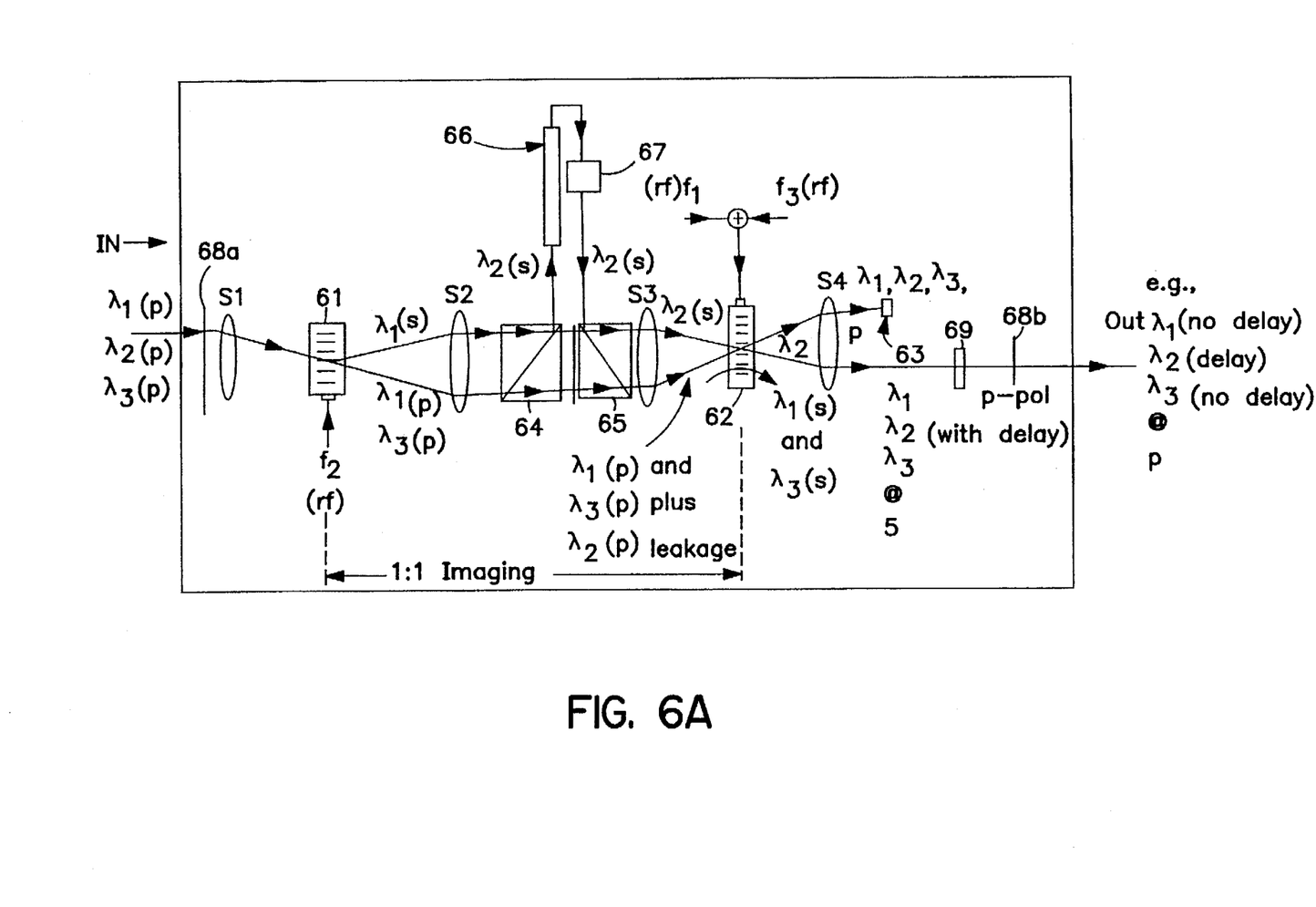
FIGS. 6a and 6b are transmissive and reflective acousto-optic tunable filter (AOTF) based multi-wavelength photonic signal control (PSC) modules which serves as a switched delay line incorporated in the embodiments of FIGS. 3 and 4 in accordance with the present invention.
Figure 6B:
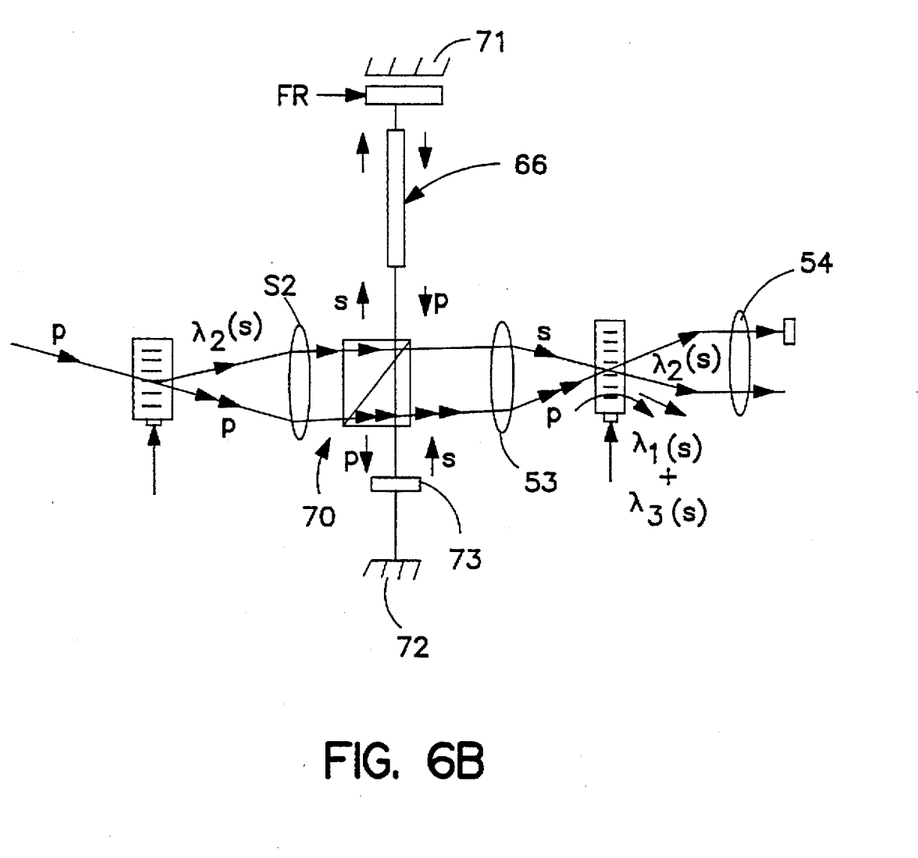

FIGS. 6a and 6b show novel, multi-wavelength input light, bulk AOTF device pair-based photonic signal control (PSC) module structure 21 that can perform various electrical and optical signal processing and control functions including a switched delay line.

As shown in FIGS. 6a and 6b, this PSC module 21 is configured as a multi-wavelength variable optical delay line, where high speed (e.g., <10 microseconds) switched variable or fixed time delay can be obtained by either trammissive (FIG. 6a) or reflective (FIG. 6b) optical structure designs. The optical delay line for long time delays (in microseconds), such as required for the ultrasonic probe, can be made by various known methods using dispersive or non-dispersive polarization maintaining fibers (PMFs), PMFs or non-PMFs with spatially distributed gratings, and dispersive or non-dispersive PMFs. Note that it may be desirable to use the PC module 67 in the optical delay path, if the optical delay line design scrambles the input linear SOP. The PSC module 21 design uses light having a linear SOP at the critical beam splitting, switching, and combining planes, such as at the bulk AOTFs, PBSs and polarizer planes.

This PSC module 21 provides certain unique properties that are not available in other known multi-wavelength optoelectronic PSC modules. First, because of the bulk nature of the optics used in the module structure, very high peak and CW optical power (e.g., 1 watt) can be processed by this module. Second, the free-space design of the PSC module 21 allows for placement of various optical signal processing (OSP) modules such as an optical delay line or polarization filters or spatial blocks. Third, using currently available high diffraction efficiency (e.g., 90%) bulk AOTFs, high optical efficiency (>80%) can be obtained for this PCS module 21. This is unlike IO AOTFs. Fourth, for collinear multi-wavelength input light, the module 21 outputs collinear multiwavelength processed light. This simplifies placement of the PCS module 21 in any cascaded optical structure such as a K-bit optical delay system formed by serially cascading K PSC modules 21 shown in FIG. 2. Both input and output light for this PSC module 21 have the same linear SOP, e.g., p SOP as shown in FIGS. 6a and 6b. If the input light is not in a linear SOP, the multiwavelength active PC module 67, identical to PC module 22, can be used to produce the desired linear SOP for all the colors. A passive PC module 67 can also be provided using a PBS-Mirror-90 degree polarization rotator arrangement to convert all input light into two adjacent beams that have the same linear SOP.

This PSC module 21 relies on an active noise reduction method using a second AOTF 62 in the in-line optical structure and Fourier plane filtering using a undiffracted beam spatial block 63. In the example of FIGS. 6a and 6b, the input light has only three distinct wavelengths $\lambda_1, \lambda_2, \lambda_3$ with the same p SOP in this example for simplicity. The first AOTF 61 is driven by an rf frequency f2 that diffracts and selects the 2nd wavelength from the input light, for example. Other frequencies would cause the AOTF 61 to select other frequencies. Due to the birefringent nature of the AOTF bulk crystal, the diffracted light has the s or orthogonal SOP compared to the input light. The first AOTF 61 shows a non-collinear AOTF design where the acoustic wave and optical wave travel in orthogonal directions. Bulk AOTFs are also made in collinear interaction geometries. In general, AOTFs are designed such that the diffraction angle is insensitive to the input band of wavelengths that is also called the optical filter 3-dB bandwidth. This PCS module 21 can be used with both non-collinear (FIG. 6) and collinear interaction geometry AOTFs. Furthermore, this PCS module 21 does not require that the AOTF diffraction angle be essentially wavelength insensitive to give the desired multi-wavelength collinear output beam. This is because appropriate imaging optics in the module (spherical lenses S1 & S2 and S3 & S4 positioned on either side of the AOFTs 61 and 62) make all the wavelengths collinear, even if they are physically separated at the Fourier plane of the second spherical lens S2.

The first AOTF 61 rf drive frequencies select the colors that are to go to an external signal processing port or selected wavelength light diverter formed by two polarizing beam splitters 64 and 65 which respectively divert and re-align a beam of one or more of the wavelengths, e.g., $\lambda_2$, into an optical processing element, such as a delay line 66 and an optional polarizing controller 67 as shown in FIG. 6a. In a reflective design, the two polarizing beam splitters 64 and 65 are replaced by a single polarizing beam splitter 70 in combination with mutually opposing mirrors 71 and 72 on the transverse sides of the beam splitter 70 and a Faraday 45° rotator 73 on one transverse side of the beam splitter 70. The undiffracted light contains all the colors that were not selected, plus some leakage light of the colors selected by the first AOTF 61. This leakage light is noise in the PSC module 21, and should be removed. In this PSC module 21, the use of the second orthogonally oriented AOTF 62 removes the leakage light noise. This is done by feeding the second AOTF 62 with rf frequencies that select all the colors not selected by the first AOTF 61. In this way, leakage light from both AOTFs 61 and 62 can be spatially separated from the selected colors, and hence physically blocked at the Fourier plane of fourth spherical lens S4 using the undiffracted beam block 63. Hence, the first AOTF 61 selects the colors (wavelengths) that need signal processing, while the second AOTF 62 acts as a leakage noise filter and multi-wavelength beam recombiner. Additionally, polarizers 68a and 68b at the input and output of the PSC module 21, as well as a rotator 69 at the output can be included. Thus, the final light output of the PSC module 21 is collinear, of one high extinction ratio linear SOP, and contains the colors that have undergone the required optical signal processing (e.g., phase shift, time delay, amplitude control, etc.). Multi-wavelength collinearity at the output of the PSC module 21 makes simpler and more efficient FO coupling, thus allowing the use of optical fibers with this module design.

Note that the second AOTF 62 can also be oriented in the same way as first AOTF 61 (as shown for the reflective delay line application). In this case, all the diffracted and selected beams have the same positive Doppler shift. The issue of Doppler shifts is important when heterodyne signal processing is involved using the PSC module 21. Both positive and negative Doppler shift AOTF operations are possible with the PSC module 21, giving flexibility to the system designer.

As mentioned before, this PSC module 21 can be used for different optical signal processing tasks with appropriate placement of optics in the free-space path. For example, the two PBSs between the second and third spherical lenses S2 and S3 can be replaced by a thick birefringent crystal or thin-birefringent film cell to form an optical phase shifter, as the diffracted light will suffer a different optical phase shift compared to the undiffracted light from the first AOTF 61. If the birefringence is electrically controlled, a variable broadband optical phase shifter is formed using the PSC module 21.

Another application of the PSC module 21 is as a high speed programmable optical filter for a broadband high power light source that eventually feeds wavelength sensitive photonic sensors and instruments used in other medical, scientific, industrial and environmental (e.g., spectroscopic) applications. In this case, the PSC module 21 does not have the two PBSs 64 and 65 and delay line 66, and colors are selected by controlling the AOTF drive frequencies. The high speed programmable optical filter can also be used for multi-wavelength optical gain equalization such as needed in WDM FO communication networks. In this case, gain equalization is achieved by controlling the amplitude of the rf drive frequencies for the two AOTFs 61 and 62.

Because current bulk AOTFs are available over a very broad spectrum of optical wavelengths, i.e., 200–4500 nm (Brimrose Corp.), a wide variety of applications are possible with the PSC module 21, including the highlighted ultrasonic probe application where the PSC module 21 is configured as a switched multi-wavelength optical delay line for ultrasonic band (e.g., 100 kHz-100 MHz) modulation, photonic signal processing.

The disclosed photonically controlled ultrasonic probe system 10 uses a single FO signal processing and remoting channel that greatly helps in reducing inter-channel differential time delay errors, as all N wavelength channels essentially pass through the same photonic control modules. Although we have shown separate photonic systems for the transmit and receive ultrasonic probes, one reversible system is possible with the use of additional transmit-receive optical and electrical switching hardware. In particular, for ultrasonic imaging needs, an N-element FO ultrasonic sensor (receive) array 37 can be embedded alongside the N-element ultrasonic transmit (T) array 27, forming an ultracompact photonically controlled ultrasonic probe. Also, to overcome optical losses, broadband (WDM-type) optical (semiconductor and doped-fiber) amplifiers can be used in this PSC and PC module based control system 10.

The present invention has been described by way of exemplary embodiments to which it is not limited. The scope of the invention is to be determined in the accompanying claims.

What is claimed is:

1. A photonically controlled ultrasonic array system comprising:
   a wave division multiplexed photonic beamformer;
   an optical fiber cable; and
   a wave division multiplexed photonic ultrasonic array remote probe, wherein said wave dispersion multiplex photonic ultrasonic array remote probe is remotely connected to said wave dispersion multiplex photonic beamformer by said optical fiber cable.

2. A photonically controlled ultrasonic array system in accordance with claim 1, wherein said optical fiber cable receives wave division multiplexed light from said wave division multiplexed photonic beamformer; and wherein said wave division multiplexed photonic ultrasonic array remote probe generates ultrasonic energy from said wave division multiplexed light received from said optical fiber cable.

3. A photonically controlled ultrasonic array system in accordance with claim 2, wherein said photonic beamformer includes:

a multiple wavelength broadband optical light source; and a single broadband optical modulator which receives light from said light source and produces optical pulses at a desired rate according to an ultrasonic rf signal.

4. A photonically controlled ultrasonic array system in accordance with claim 3, wherein said broadband optical source is a light source selected from a group consisting of continuous wave lasers and pulsed lasers.

5. A photonically controlled ultrasonic array system in accordance with claim 2, wherein said photonic beamformer includes a multiple channel polarization control module.

6. A photonically controlled ultrasonic array system in accordance with claim 2, wherein said photonic beamformer includes a fiber optic delay line module.

7. A photonically controlled ultrasonic array system in accordance with claim 6, wherein said delay line module imparts different time delays on different wavelengths as required for forming the desired ultrasonic beam at the remote probe location.

8. A photonically controlled ultrasonic array system in accordance with claim 2, wherein said optical fiber cable is an ultra-thin, zero dispersion optical fiber cable.

9. A photonically controlled ultrasonic array system in accordance with claim 2, wherein said ultrasonic array remote probe includes a demultiplexer for demultiplexing said wave division multiplexed light in the remote probe.

10. A photonically controlled ultrasonic array system in accordance with claim 9, wherein said demultiplexer includes diffractive optical elements.

11. A photonically controlled ultrasonic array system in accordance with claim 9, wherein said remote probe includes a multiple element ultrasonic transducer array that generates the desired ultrasonic beam in response to said demultiplexed light at a remote site.

12. A photonically controlled ultrasonic array system in accordance with claim 11, wherein said multiple element ultrasonic transducer array includes photoconductive switches and corresponding piezoelectric transducer elements driven by said photoconductive switches.

13. A photonically controlled ultrasonic array system in accordance with claim 11, wherein said multiple element ultrasonic transducer array includes photoacoustic material.

14. A photonically controlled ultrasonic array system in accordance with claim 1, wherein said wave division multiplexed photonic beamformer including a multiple wavelength light source which acts as a continuous local oscillator for said wave division multiplexed photonic ultrasonic array remote probe;

wherein said optical fiber cable receives multiple wavelength light from said light source; and wherein said wave division multiplexed photonic ultrasonic array remote probe which modulates said multiple wavelength light in response to received ultrasonic energy and transmits said modulated multiple wavelength light through said optical fiber cable to said wave division multiplexed photonic beamformer.

15. A photonically controlled ultrasonic array system in accordance with claim 14, wherein said photonic beamformer includes a multiple channel polarization control module.

16. A photonically controlled ultrasonic array system in accordance with claims 5 or 15, wherein said multiple channel polarization control module includes:

a wavelength demultiplexer physically separates the different wavelength light beams;

two pixelated and orthogonally oriented polarization mode converters receiving and converting the polarization of said different wavelength light beams;

a Mach-Zehnder interferometer including a cube beamsplitter;

a cube broadband polarizing beam splitter (PBS) receiving near equal amplitude p and s states of polarization (SOPs) from said polarization mode converters and individually directing the p and s SOPs to separate first and second paths, which are designed to be equal, respectively, in said Mach-Zehnder interferometer;

first and second phase shifters in said first and second paths providing the required optical phase shift of the s and p SOP beams;

first and second 90° polarization rotators operating 180° out-of-phase to determine whether p or s linear SOP is output from said polarization control module, wherein by controlling said first and second mode converters, said first and second phase shifters, and said first and second rotators, the two beams interfering at said cube beamsplitter can be made to be equal in amplitude, in-phase or 180 degree out-of-phase, and hence of the desired p or s linear SOP; and multiplexers which recombine the different wavelengths to create the desired s or p SOP collinear multiwavelength output beams.

17. A photonically controlled ultrasonic array system in accordance with claim 16, wherein said wavelength demultiplexer includes a wavelength spatially dispersive optical element and a spherical collimating lens.

18. A photonically controlled ultrasonic array system in accordance with claim 16, wherein said polarization mode converters include 90 degree twist nematic liquid crystal (NLC) devices, where a first mode converter rotates p to s state of polarization (SOP), with full 90 degree rotation obtained when the device has no applied voltage, while essentially no linear SOP rotation when a voltage is applied; the first mode converter provides high resolution grey-scale linear SOP rotation between 90 and zero degrees for a variable applied voltage, and the second mode converter is a similar, but orthogonally oriented 90 degree twist NLC device wherein the second mode converter rotates s to p linear SOP over a grey-scale rotation angle controlled by the variable applied voltage.

19. A photonically controlled ultrasonic array system in accordance with claim 16, wherein said first and second phase shifters include parallel-rub, birefringent-mode, electrically controllable nematic liquid crystal devices.

20. A photonically controlled ultrasonic array system in accordance with claim 16, wherein said first and second rotators act as broadband 90 degree on/off mode linear state of polarization rotators, and include at least one of 90 degree twist nematic liquid crystal devices and binary ferroelectric liquid crystal devices.

21. A photonically controlled ultrasonic array system in accordance with claim 14, wherein said photonic beamformer includes a single physical optical channel, fiber optic delay line module.

22. A photonically controlled ultrasonic array system in accordance with claim 21, wherein said delay line module removes different time delays on different wavelengths as required for forming a desired ultrasonic image at said photonic beamformer.

23. A photonically controlled ultrasonic array system in accordance with claim 22, wherein said ultrasonic array remote probe includes a multiplexer/demultiplexer for separating and combining in said remote probe different wavelengths transmitted over said optical fiber cable.

24. A photonically controlled ultrasonic array system in accordance with claim 23, wherein said remote probe includes a multiple element ultrasonic transducer array that modulates said demultiplexed wavelengths to provide ultrasonic signal modulations in response to an ultrasonic beam at a remote site.

25. A photonically controlled ultrasonic array system in accordance with claim 24, wherein said multiple element ultrasonic transducer array includes at least one of acoustically sensitive fiber Bragg grating tips, and Zinc Oxide (ZnO) piezoelectric coated fibers.

26. A photonically controlled ultrasonic array system in accordance with claims 6 or 21, wherein said single physical optical channel, fiber optic delay line module includes:

a first acousto-optic tunable filter (AOTF) to spatially separate at least one selected wavelength of light from others;

a selected wavelength light diverter to divert said selected light;

an optical delay line to delay said selected light, said diverter re-aligning said selected light in an optical path of said fiber optic delay line module; and a second AOTF and a spatial block for Fourier plane filtering to reduce noise.

27. A photonically controlled ultrasonic array system in accordance with claim 26, wherein said first AOTF is driven by an rf frequency that diffracts and selects light of a given wavelength from the input light.

28. A photonically controlled ultrasonic array system in accordance with claim 27, wherein said single physical optical channel, fiber optic delay line module further includes spherical lenses positioned on either side of said first and second AOFTs and collimate all beams of wavelengths.

29. A photonically controlled ultrasonic array system in accordance with claim 14, further comprising an optical circulator.

30. A photonically controlled ultrasonic array system in accordance with claim 14, further comprising means for adding the received ultrasonic signal modulations.

31. A multiple channel polarization control module comprising:

a wavelength demultiplexer physically separates the different wavelength light beams;

two pixelated and orthogonally oriented polarization mode converters receiving and converting the polarization of said different wavelength light beams;

a Mach-Zehnder interferometer including a cube beamsplitter;

a cube broadband polarizing beam splitter (PBS) receiving near equal amplitude p and s states of polarization (SOPs) from said polarization mode converters and individually directing the p and s SOPs to separate first and second paths, which are designed to be equal, respectively, in said Mach-Zehnder interferometer;

first and second phase shifters in said first and second paths providing the required optical phase shift of the s and p SOP beams;

first and second 90° polarization rotators operating 180° out-of-phase to determine whether p or s linear SOP is output from said polarization control module, wherein by controlling said first and second mode converters, said first and second phase shifters, and said first and second rotators, the two beams interfering at said cube beamsplitter can be made to be equal in amplitude, in-phase or 180 degree out-of-phase, and hence of the desired p or s linear SOP; and multiplexers which recombine the different wavelengths to create the desired s or p SOP collinear multi-wavelength output beams.

32. An multi-wavelength photonic signal control module comprising:

a first acousto-optic tunable filter (AOTF) to spatially separate at least one selected wavelength of light from others in a multiwavelength beam;

an external signal processing port which diverts and re-aligns a beam of one or more of the wavelengths into an optical processing element, said external signal processing port re-aligning said selected light in an optical path of said photonic signal control module; and a second AOTF and a spatial block for Fourier plane filtering to reduce noise.

33. An multi-wavelength photonic signal control module in accordance with claim 32, wherein said first AOTF is driven by an rf frequency that diffracts and selects light of a given wavelength from the input light.

34. An multi-wavelength photonic signal control module in accordance with claim 32, wherein said external signal processing port includes an optical delay line to delay said selected light, said diverter re-aligning said selected light in an optical path of said signal control module.

* * * * *